DEVICE HAVING A FRICTION DRIVE BETWEEN TWO SURFACES IN A LIQUID

Filed Feb. 14, 1967 3 Sheets-Sheet 1

INVENTOR
JACQUES EDOUARD FLICHY
BY
Woodhams, Blanchard and Flynn
ATTORNEYS

INVENTOR
JACQUES EDOUARD FLICHY
BY
Woodhams, Blanchard & Flynn
ATTORNEYS

Oct. 17, 1967 J. E. FLICHY 3,347,106

DEVICE HAVING A FRICTION DRIVE BETWEEN TWO SURFACES IN A LIQUID

Filed Feb. 14, 1967 3 Sheets-Sheet 3

INVENTOR.
JACQUES EDOUARD FLICHY
BY
Woodhams, Blanchard and Flynn
ATTORNEYS

United States Patent Office 3,347,106
Patented Oct. 17, 1967

3,347,106

DEVICE HAVING A FRICTION DRIVE BETWEEN TWO SURFACES IN A LIQUID

Jacques Edouard Flichy, Paris, France, assignor to Ateliers Metallurgiques de Saint-Urbain, Fronville, Haute Marne, France, a company of France Filed Feb. 14, 1967, Ser. No. 615,953
Claims priority, application France, Feb. 14, 1967, 94,917
9 Claims. (Cl. 74—199)

ABSTRACT OF THE DISCLOSURE

A pair of members having relatively smooth, annular and nonparallel surfaces are arranged and supported so that, under most operating circumstances, relatively small portions of said surfaces are engaged in a liquid medium and at least one of said members has a plurality of elongated passages of relatively small cross section adapted to communicate between points on said surface thereof and regions spaced from said points. The circular members are supported for relative rotational movement and for relative, substantially linear movement transverse of the direction of the rotational movement through said portions of engagement, such linear movement being effected while maintaining the engagement of said portions. Sufficient liquid is maintained adjacent the engaged portions of the surfaces to form a liquid wedge between said surfaces as they are relatively rotated, and said surfaces are urged toward each other to effect engagement between said portions.

This application is a continuation-in-part of Serial No. 414,647, filed Nov. 30, 1964, and entitled Devices Employing a Friction Drive Between Two Surfaces in a Liquid Medium.

A large number of devices are already known which make use of a friction drive between two smooth and nonparallel surfaces in a liquid medium. It is therefore solely by way of illustrative example, and not in any sense by way of limitation, that reference will be made in the following description to a speed-changing mechanism of the type comprising a driving shaft on which are formed splines. A plurality of cone-shaped disks are supported on said shaft for axial sliding motion and the combined assembly is placed within a driving drum which is integral with a driven shaft. Said drum has internal splines along which are adapted to slide rings having a circular internal portion in the form of an annular enlargement, and said rings are interleaved between the disks. Means are provided for the purpose of pressing the pile of disks and rings together and for the purpose of modifying the distance between the axis of the driving shaft and the axis of the drum.

In the above assembly, the two surfaces which provide a friction drive are constituted by the lateral or axial surface of a disk on the one hand and the lateral or axial surface of the annular enlargement of a ring on the other hand. In addition, the engaged surfaces of the rings and disks work in a liquid medium, such as oil, which is admitted axially into the apparatus.

The applicant has studied the means for improving the friction drive between two generally smooth surfaces of this type and has observed that the liquid wedge which is formed in the contact zone of said surfaces is extremely unfavorable to the transmission of power since it reduces the apparent coefficient of friction.

In point of fact, the present applicant has discovered that it is possible to reduce to a very substantial extent the influence of the liquid wedge by forming in at least one of the smooth surfaces a series of grooves which are fine and closely spaced such as, for example, greater in number than four per centimeter and which have their terminal ends outside the zone of engagement. The action of such grooves is all the more marked as the number of grooves is greater, within the limits of retaining a generally smooth surface.

It should be pointed out that the term "fine" grooves is understood to mean grooves having a cross-sectional area which is as small as industrially economic methods of machining will permit. On a metallic surface, for example, grooves can readily be cut which have a cross-sectional width in the order of one-tenth of a millimeter, and it is a dimension of this order which it therefore appears necessary to adopt.

Similarly, it should be explained that the expression "closely spaced" grooves implies a number of grooves which is greater than four per centimeter, this number being limited by the need to retain a surface which may be considered as smooth. It should be added that, in practice, it would not be permissible to exceed a certain maximum number of grooves, above which the unitary pressure exerted between the two surfaces would exceed that which can be withstood by the materials of the surfaces in contact without subjecting one or both surfaces to nonelastic deformtion. For example, in the case of grooves formed in a metal surface, each groove having the cross-sectional dimension stated above, it would appear advisable to allow a distance between two successive grooves which is not less than approximately three times the width of said grooves. However, these limitations are based upon presently available materials and methods so that closer spacing of the grooves could be possible with improved methods and materials.

As indicated above, a prime reason for the grooves in at least one of the engaged surfaces is to relieve the pressure developed in the liquid wedge which is formed just ahead of the engaging portions of the surfaces. Thus, it is obviously not essential that the grooves be exposed throughout their length from points on an engageable surface, where they can communicate with the liquid wedge, to points which are spaced from the wedge and are at a relatively lower pressure. For example, as is discussed hereinafter, the desired results can be achieved by relatively small and elongated pasageways, each of which opens at one end through one of the engageable surfaces and at the other end through a part of the member spaced from its engageable surface or at least spaced from the presently engaged portion of the surface during normal operation.

It was initially believed that completely superficial grooves were of material importance in reducing frictional losses, if only because they might facilitate the dissipation of the friction creating pressure more effectively. Moreover, it was also felt that the specific arrangement and location of the grooves in the engageable surfaces would also have a material effect upon the efficiency of the device. However, subsequent tests, which required time to perform and the results of which required additional time to analyze, have indicated that an efficient driving relationship can be maintained between the annular surfaces where at least a part of each passage extends into and through the body of its circular member, provided that it is in fact adapted to connect the high pressure zone in the wedge to a relatively low pressure zone.

Furthermore, it has been determined that the grooves can be irregular in shape, size, arrangement and distribution along the engageable surfaces, provided that they are sufficient in number and relative proximity to provide a substantially constant access of pressure relief from the wedge, as it moves along the engageable surfaces during the rotational operation of the device, to a zone of relatively low pressure.

To revert to one example which has been chosen, the present applicant has found that the friction drive, which is provided by a speed-changing mechanism in accordance with this example, was considerably improved and could transmit torques of double or even more than double the value, all other things being equal, if grooves such as those specified above were cut either in one or in the other of the driving surfaces. The grooves are preferably in the lateral surfaces of the annular enlargements of the rings, this being due in all likelihood to the fact that the liquid which forms a wedge is discharged more readily through the grooves in the rings thereby sustaining a considerable pressure drop while maintaining adequate lubricating and cooling effects.

As a preferable feature, the grooves in accordance with the invention are formed in a first surface parallel to the mean direction of the relative velocity of the second surface with respect to the first, said relative velocity being considered in the zone of maximum pressure of the liquid wedge under normal operating conditions of the apparatus. This arrangement facilitates the discharge of liquid through the grooves by permitting the propulsion of the liquid as a result of the movement of the second surface relatively to the first.

The present applicant has also discovered that it is possible to reduce the mean pressure of the liquid wedge even further and therefore to achieve a further improvement in the friction drive by forming a second series of grooves crosswise with respect to the first, thereby creating a further succession of lines of zero pressure (or more precisely of pressure which is equal to the mean pressure of the liquid outside the wedge).

As a preferable feature, the grooves of the second series are at least approximately perpendicular to the grooves of the first series. In fact, it was this crisscrossing of relatively uniform and symmetrical grooves which caused applicant to recognize that grooves of irregular shape and arrangement would be capable of producing the desired results, and subsequent studies have confirmed this belief.

A clear understanding of the invention will in any case be gained by consideration of the description which now follows, reference being made to the accompanying drawings which show by way of nonlimitative example a speed-changing mechanism provided with grooves or passages in accordance with the invention, and in which.

Figures 1, 2, 3:
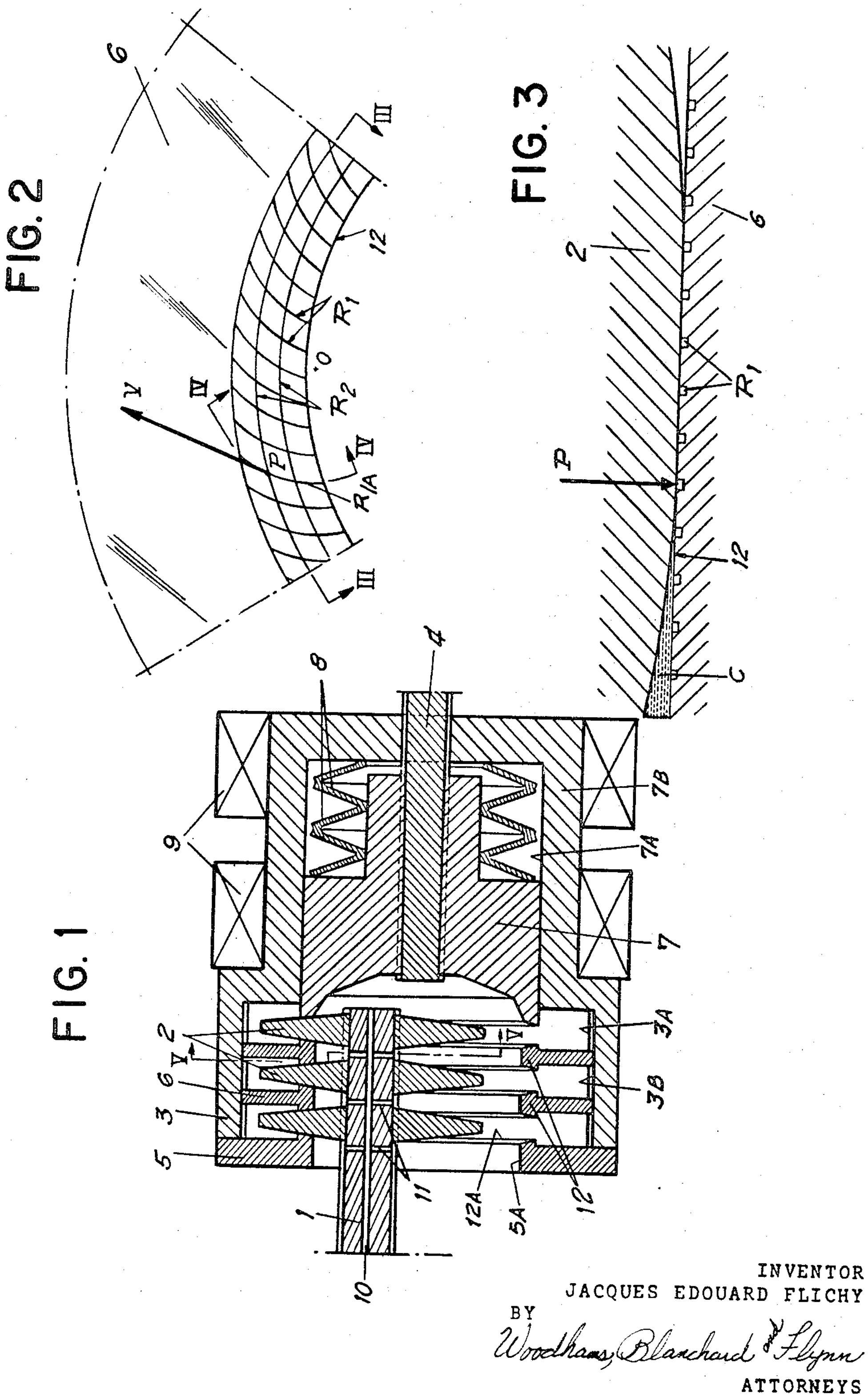
FIGURE 1 shows the speed-changing mechanism in diagrammatic, central cross section.
FIGURE 2 is a fragmentary, lateral view of one of the rings shown on a larger scale.
FIGURE 3 is an enlarged sectional view substantially as taken along the line III—III in FIGURE 2 and showing the relative locations of the grooves and the wedge of lubricant.

Reference being made to FIGURE 1, it can be seen that a speed-changing mechanism embodying the invention is essentially composed of a driving shaft 1, said shaft being provided with splines and encircled by cone disks 2 which are adapted to slide axially of the shaft. The combined assembly is placed inside a drum 3 which is made fast for rotation with a driven shaft 4, the said driving shaft 1 being adapted to extend inside the drum through the central opening 5A in the end plate 5. Between the disks 2 are interleaved rings 6 provided with annular enlargements 12. The first enlargement 12A is integral with the end plate 5. The last enlargement is located at the opposite end of the drum chamber 3A and is integral with a bell-shaped member 7 housed within the chamber 7A which is defined by a portion 7B of the drum 3 which is coaxial with, of less diameter than and in communication with the drum chamber 3A. The member 7 is urged by flexible washers 8 toward the end plate 5 whereby the disks 2 and the rings 6 are axially compressed. The intermediate rings 6 are capable of sliding within the drum chamber 3A along the splines 3B formed in the internal wall of the drum 3. The combined assembly is, for example, carried on roller bearings 9.

It is known that a speed-changing mechanism of this type is operated by modifying the distance between the axis of the driving shaft 1 and that of the drum 3 with the result that the transmission ratio, which is equal to one, if this distance is zero, varies progressively as the annular enlargements 12 penetrate deeper between the disks 2. The oil, in which the engaged surfaces of the rotating parts are immersed, can be supplied through an axial duct 10 in the shaft 1 and the duct 10 may or may not be extended by connection to the radial ducts 11.

It follows from the foregoing that the transmission of power from the shaft 1 to the drum 3 may be carried out solely as a result of friction between the engaged, lateral or axial surfaces of the disks 2 and the anular enlargements 12 of the rings 6.

It is for this reason that the present applicant has made provision in the said anular enlargements for grooves such as those which are shown in FIGURE 2.

Figure 6:
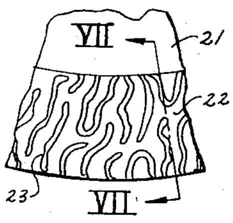
FIGURE 6 is a fragment of the structure appearing in FIGURE 2 and showing the grooves in an irregular arrangement.
Figure 8:
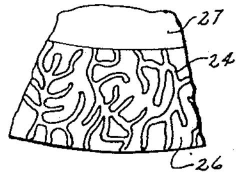
FIGURE 8 is a fragment similar to FIGURE 6 and showing a further type of irregular groove arrangement.

There can be seen in FIGURE 2 an annular enlargement 12 of a ring 6 in which is formed a series of grooves $R_1$ which can have any desired cross-sectional configuration, for example, rectangular. Each groove $R_1$ (FIGURE 2) has a center of curvature, such as the center O for the groove $R_{1A}$. Each such center O occupies a predetermined position with respect to the instantaneous center of rotation of the corresponding disk and the mean position of the shaft 1 when its corresponding groove is located in the zone of maximum pressure of the liquid wedge. The point P, along each groove $R_1$ is located in the zone of maximum pressure of the liquid wedge when said point is in the zone in which the surfaces of the enlargement 12 and disk 2 are substantially in contact. Thus, when the point P of the groove $R_{1A}$, for example, is in the zone of maximum pressure, said groove $R_{1A}$ is substantially parallel to the vector V, which represents the direction of relative movement of the opposing point on the disk 2 with respect to the point P on the anular enlargement 12. It will incidentally be noted that the grooves $R_1$ are not necessarily circular. The ends of the grooves can be rectilinear over a short zone. Under other operating conditions, the shape of the grooves can be complex. More specifically, the grooves can be as shown in FIGURES 6 and 8 and described in detail hereinafter.

A second series of grooves $R_2$ which can have the same cross-sectional area and configuration has been formed in the axial faces of the enlargements 12 concentrically with the rings 6.

As has ben mentioned earlier, a speed-changing mechanism which is improved in this manner transmits torques which are considerably higher and even multiplies of those which are transmitted when grooves are not provided.

In point of fact, the liquid or oil wedge C, which has been illustrated in FIGURE 3 and which is formed between a disk 2 and an anular enlargement 12 in front of the zone in which the surfaces come into contact, is partially discharged through a groove $R_1$ and the oil pressure therein is therefore relatively low. The pressure along the transverse grooves $R_2$, which is already low since said grooves pass entirely through the liquid wedge, is rendered even lower by virtue of the fact that the grooves $R_2$ cross the grooves $R_1$.

It will in any case be readily understood that this application of the invention only constitutes one example among a large number of other applications which could be contemplated. Furthermore, the grooves could have been cut in the disks or in both surfaces. It will also be apparent that, if said grooves are cut in the disks, the working zone on the disks must be large enough to permit the adjustment of the apparatus over a larger radial surface. Thus, the grooves $R_1$ must be cut in the disks so as to take into account that the amount of variation in the direction of the relative speed is a function of the radius at the corresponding point of engagement between a disk and a ring.

Figure 7:
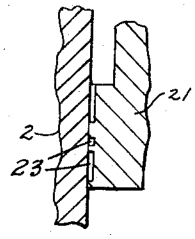
FIGURE 7 is a sectional view taken along the line VII—VII in FIGURE 6.

FIGURES 6 and 7 illustrate a modified ring 21 in combination with a disk 2 wherein the enlargement 22 of the ring 21 has irregularly shaped and randomly arranged grooves 23. Consistent with an essential requirement of the invention, the grooves 23 are relatively thin or narrow and capable of communicating between the high pressure zone within the liquid wedge formed between the ring 21 and the disk 2 and a zone of relatively low pressure spaced from the wedge. In all other respects, the ring 21 could be substantially identical with the ring 6 described above. The random grooves 23 could be formed in a variety of ways, as by matching or etching.

The grooves 24 (FIGURE 8) in the enlargement 26 of the modified ring 27 are also irregular in shape and randomly arranged along an anular surface of engagement. Moreover, grooves 24 have main stems, which extend to points of low pressure, and branches which extend away from the main stems. However, as in the case of the grooves 23, the grooves 24 are relatively fine and could be formed by a machining or etching process, for example. Although the grooves 23 and 24 are located at random, it is essential that they be arranged along the engageable surface of the enlargements 22 and 26, respectively, so that they are capable of relieving pressure within the wedge formed between the engaged surfaces as such wedge moves ahead of the engaged portions of said surfaces.

Figure 9:
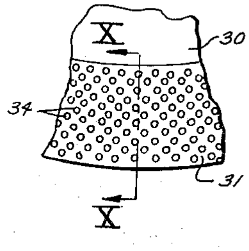
FIGURE 9 is a fragment of FIGURE 2 illustrating a plurality of passages in place of grooves.
Figure 10:
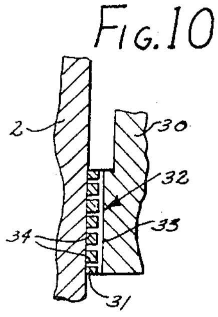
FIGURE 10 is a sectional view taken along the line X—X in FIGURE 9.

FIGURES 9 and 10 illustrate a ring 30 having an enlargement 31 through which a plurality of passages 32 are formed so that they communicate between the zone occupied by the liquid wedge and a region of relatively low pressure as the ring 30 and disk 2 are rotated in the normal operation of the drive mechanism. The passages 32 in this particular embodiment are comprised of transverse passageways 33 and inlet passageways 34 which penetrate through the engaging surface of the enlargement 31. Thus, the relatively high pressure encountered in the wedge by the entrance passageways 34 is relieved through the transverse passageways 33. The distribution of the entrance passageways 34, like the distribution of the irregular grooves 23 of FIGURE 6 is such that all portions of the engageable surface on ring 30 will be provided with adequate access to a low pressure zone.

The passages 32 can be provided by a variety of methods such as by drilling or by grooving a surface and then overlying it with a perforate plate containing the passageways 34 which are arranged to communicate with the grooves which, when covered by the perforate plate, form the passageways 33.

Figure 12:
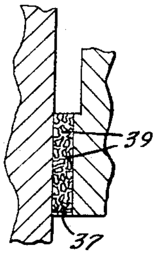
FIGURE 12 is a sectional view taken along the line XII—XII in FIGURE 11.
Figure 11:
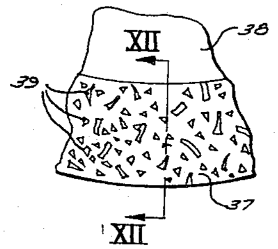
FIGURE 11 is a fragment similar to FIGURE 9 in which the passages are arranged in an irregular pattern.

FIGURES 11 and 12 illustrate passageways 39 which are provided by the spaces between irregularly distributed fragments forming the enlargement 37 on the ring 38. For example, the enlargement 37 may be formed by an agglomeration of small, metal fragments defining the desired passageways 39 therebetween. This random passage construction could also be provided by forming a plate comprising a mixture of two materials, one of which is extremely hard and durable, such as steel, and the other of which can be removed from the mixture by heating or by chemical treatment. Thus, the resultant porosity of the hard material will produce the passageways 39.

Figure 5:
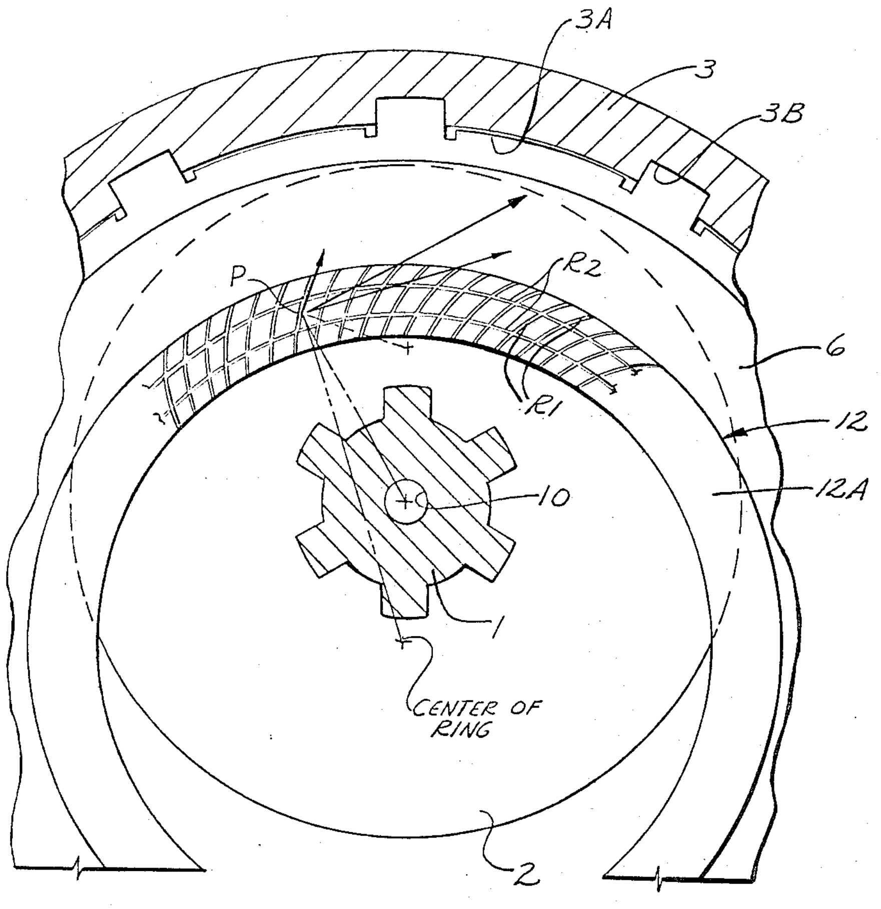
FIGURE 5 is a diagrammatic, cross-sectional view of the speed-changing device substantially as taken along the line V—V in FIGURE 1.
Figure 4:
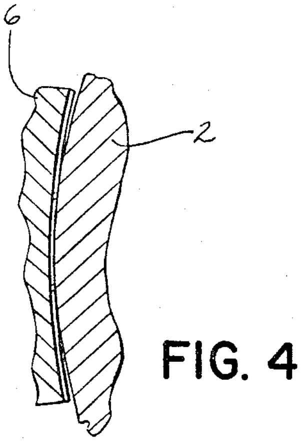
FIGURE 4 is a sectional view substantially as taken along the line IV—IV in FIGURE 2 and showing both engaging surfaces.
Figure 13:
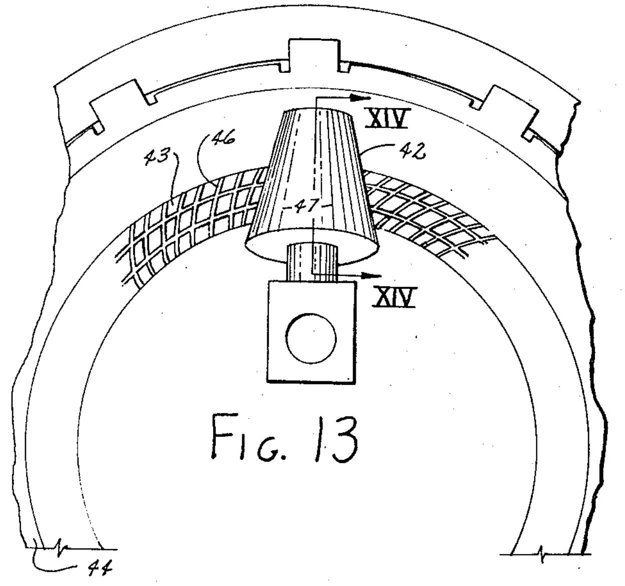
FIGURE 13 is a cross-sectional view similar to that appearing in FIGURE 5 and illustrating a modified type of driving member.
Figure 14:
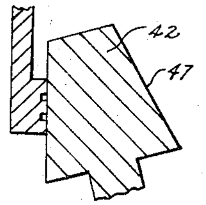
FIGURE 14 is a sectional view taken along the line XIV—XIV in FIGURE 13.

FIGURE 13 illustrates a fragmentary view similar to that appearing in FIGURE 5 and including a different type of driving member 42 in place of the disk 2 of FIGURE 5. More specifically, the enlarged portion 43 of the ring 44 has grooves 46 along the surface thereof engaged by the conical outer surface 47 of the driving member 42. The driving member 42 is capable of being moved transversely or radially of the enlargement 43 to effect a speed change in substantially the same manner as the speed change is achieved with the structure appearing in FIGURE 5.

Although particular preferred embodiments of the invention have ben disclosed above for illustrative purposes, it will be understood that variations or modifications of such disclosure which come within the scope of the appended claims are fully contemplated.

The embodiments of the invention in which an exclusive property or privilege is claimed are defined as follows:

1. A device employing a friction drive comprising:
first and second members having relatively smooth, annular and nonparallel surfaces, portions of said surfaces being adapted to be engaged in a liquid medium;
first and second means respectively supporting said first and second members for relative rotational movement and for relative, substantially linear movement between said members transverse of the direction of said rotational movement while maintaining said engagement, a wedge of said liquid medium being formed between said surfaces by said rotational movement;
means defining in at least one of said members a plurality of relatively small passages adapted to communicate between said liquid wedge and a zone of relatively low pressure during said rotational movement; and
means urging said surfaces together.

2. A device according to claim 1 wherein said passages are substantially parallel and both of said members are adapted for rotation.

3. A speed-changing device according to claim 1 wherein said passages are iregularly shaped and randomly arranged grooves extending along the smooth surface of said one member between a first zone occupied by said wedge and a second zone spaced from said first zone and of relatively low pressure.

4. A speed-changing device employing a friction drive, comprising:
two members rotatable around axes and having smooth and nonparallel surfaces, portions of said surfaces being adapted to be engaged in a liquid medium;
means supporting said members for rotation around said axes, said supporting means being adapted to effect relative transaxial movement of one of said members with respect to the other;
means defining in at least one of the members a plurality of passages which are narrow and closely spaced, said passages being arranged around the axis of said one member and being adapted to communicate between said liquid wedge and a zone of relatively low pressure during said rotation of said members; and means urging said surfaces together.

5. A device according to claim 4 wherein said passages are arranged in an annular path concentric with the axis of said one member, said passages having ends which penetrate the smooth surface on said one member, said ends being greater in number than four per centimeter along said path.

6. A device according to claim 4 wherein said ends of said passages are substantially uniformly arranged and distributed along said path.

7. A device according to claim 4 wherein said ends of said passages are of irregular size and shape.

8. A device according to claim 4 wherein said members are rotated around axes disposed at substantial angles to each other and defining a plane passing through the portions of said surfaces engaged in the liquid medium.

9. A speed-changing device comprising first and second members rotatable about axes, said members being relatively movable transaxially of at least one of said members and having nonparallel surfaces, portions of which are adapted to be engaged in a liquid medium;

means supporting said members for rotation around said axes, said supporting means being capable of effecting said transaxial movement of one of said members with respect to the other;

means defining in one of said surfaces a plurality of irregularly shaped and randomly disposed grooves arranged along a circular path around one of said axes, said grooves being relatively narrow and closely spaced along said path, a wedge of said liquid medium being formed between said surfaces when said members are rotated; and means urging said portions of said surfaces together, said grooves being arranged to communicate between a first zone occupied by said wedge and a second zone spaced from said first zone and of relatively lower pressure.

References Cited

UNITED STATES PATENTS

| | | | |
|---|---|---|---|
| 1,823,226 | 9/1931 | Abbott | 74—199 |
| 2,879,871 | 3/1959 | Van Ranst | 192—113 X |
| 3,048,250 | 8/1962 | Kershner | 192—107 |
| 3,073,424 | 1/1963 | Russell | 192—113 |
| 3,094,194 | 6/1963 | Kershner | 192—113 X |
| 3,238,818 | 3/1966 | Heintz | 74—199 X |

DONLEY J. STOCKING, *Primary Examiner.*

L. H. GERIN, *Assistant Examiner.*